Dec. 7, 1926. 1,609,491
C. G. MYERS
BOX LINING MACHINE
Filed May 19, 1926 7 Sheets-Sheet 1

Inventor:
Chester G. Myers,
by Spear Middleton Donaldson Hall
Attys.

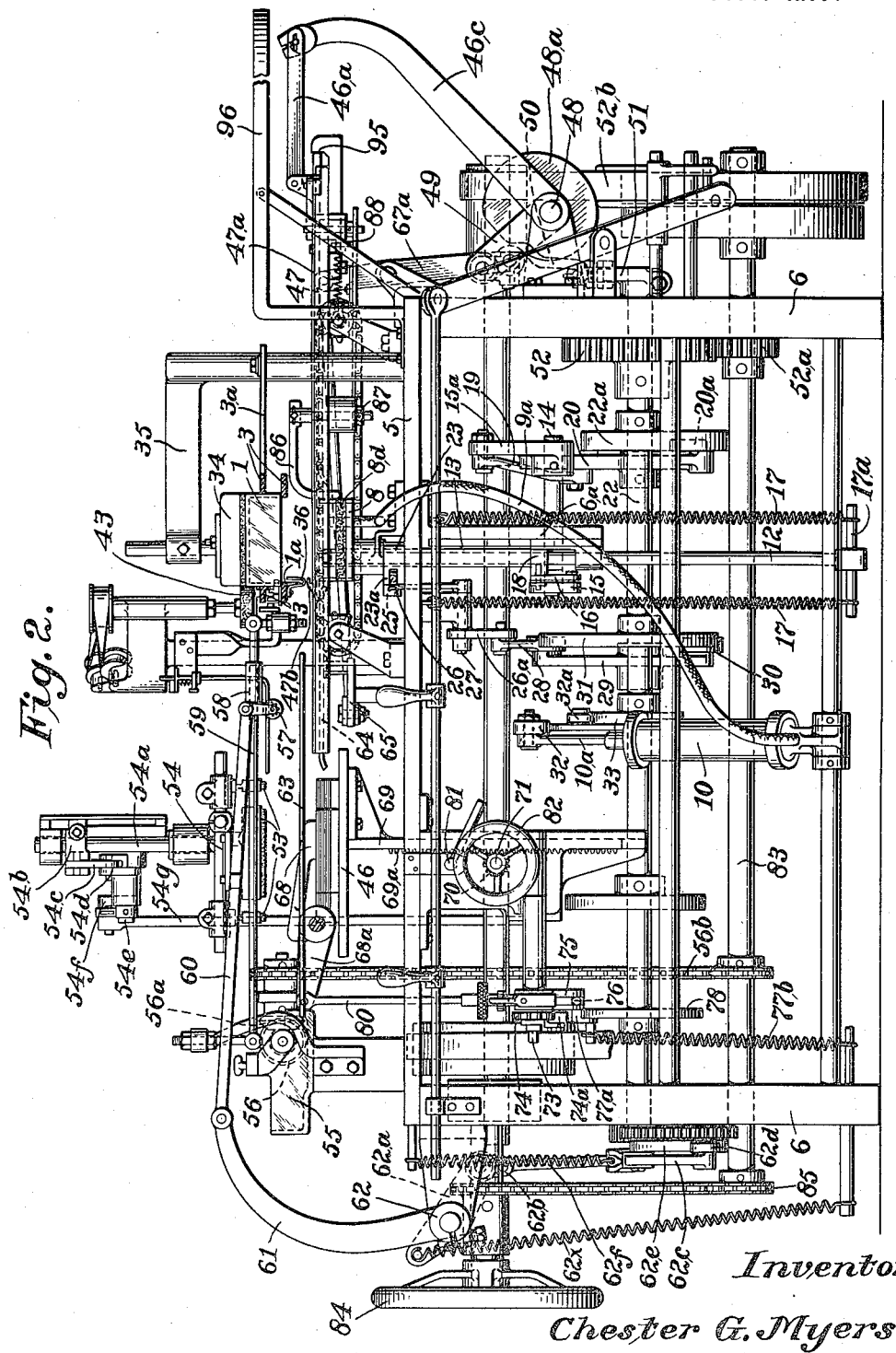

Dec. 7, 1926.
C. G. MYERS
BOX LINING MACHINE
Filed May 19, 1926
1,609,491
7 Sheets-Sheet 3
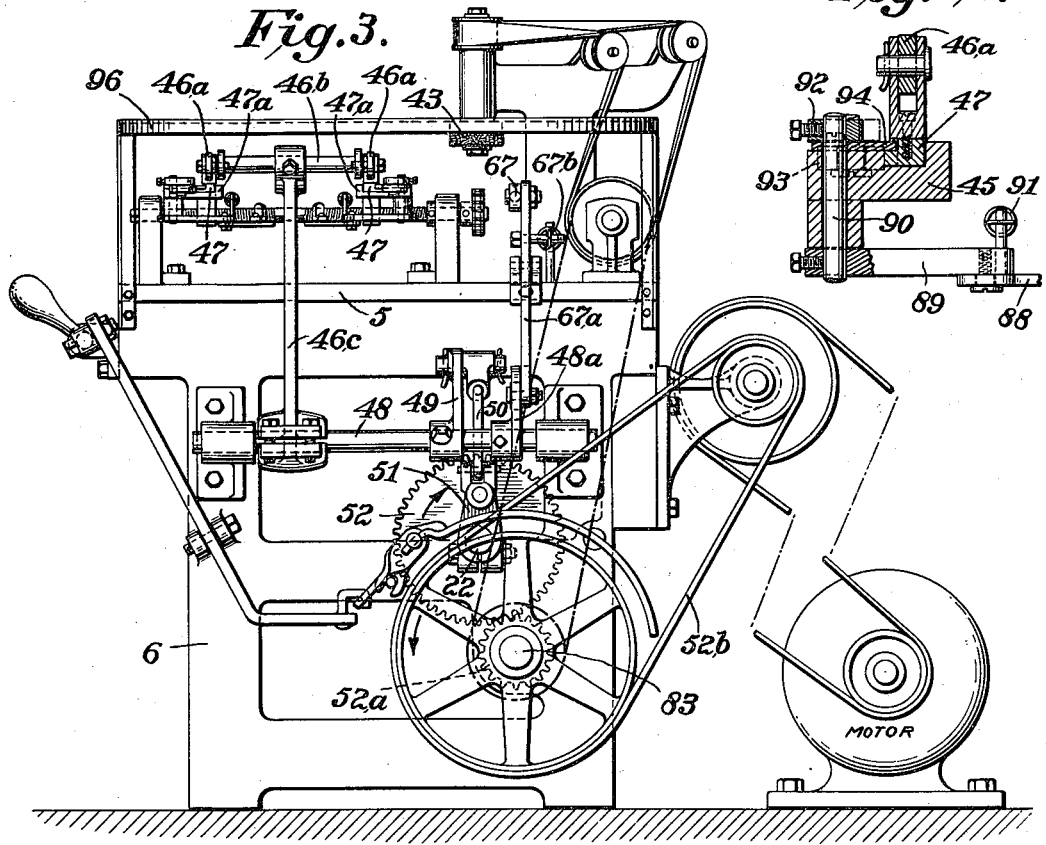
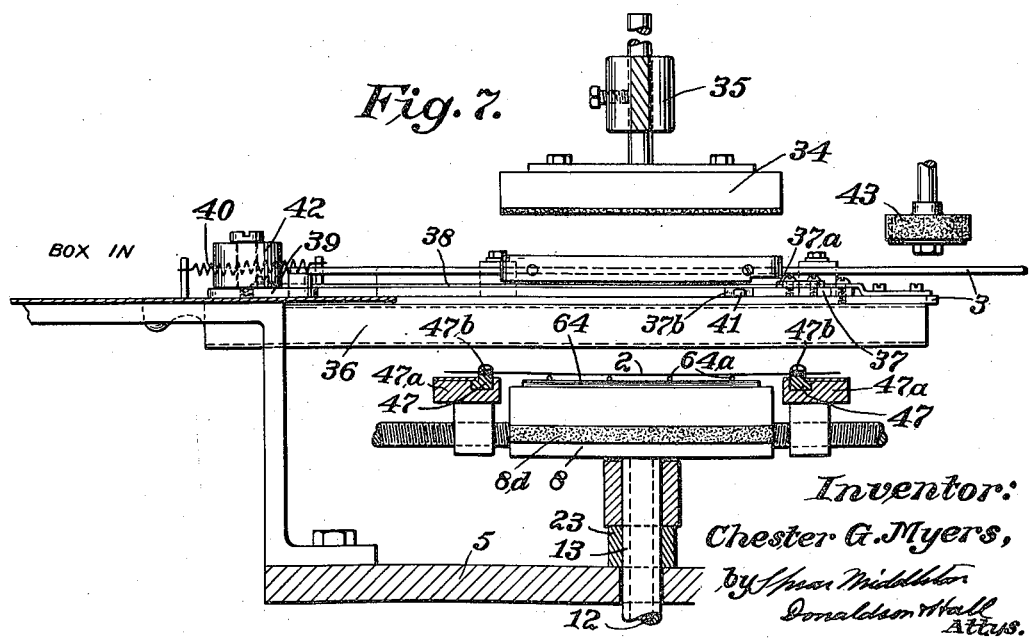

Dec. 7, 1926.
C. G. MYERS
1,609,491
BOX LINING MACHINE
Filed May 19, 1926　　　　7 Sheets-Sheet 4
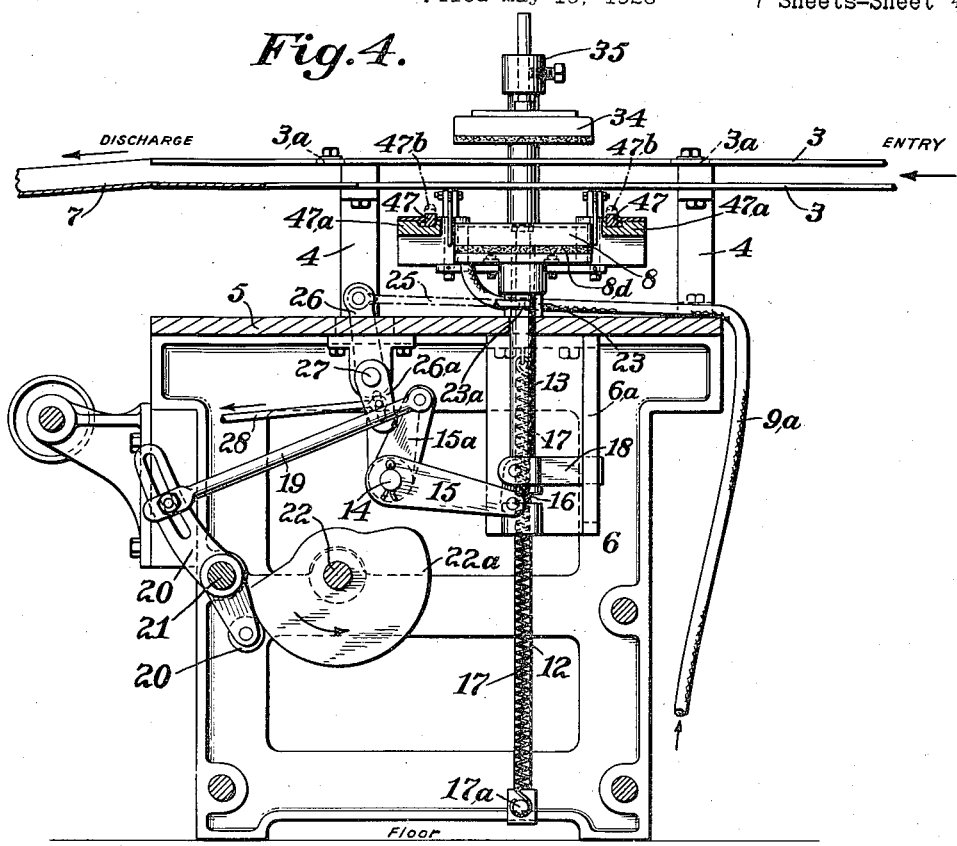
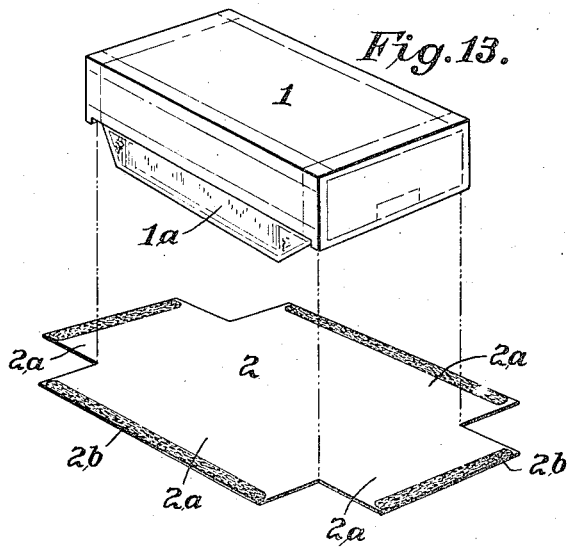
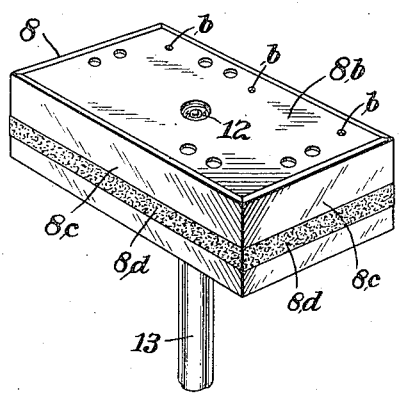
Inventor:
Chester G. Myers,
by Myers Middleton Donaldson & Hall
Attys.

Dec. 7, 1926.  
C. G. MYERS  
1,609,491  
BOX LINING MACHINE  
Filed May 19, 1926    7 Sheets-Sheet 5
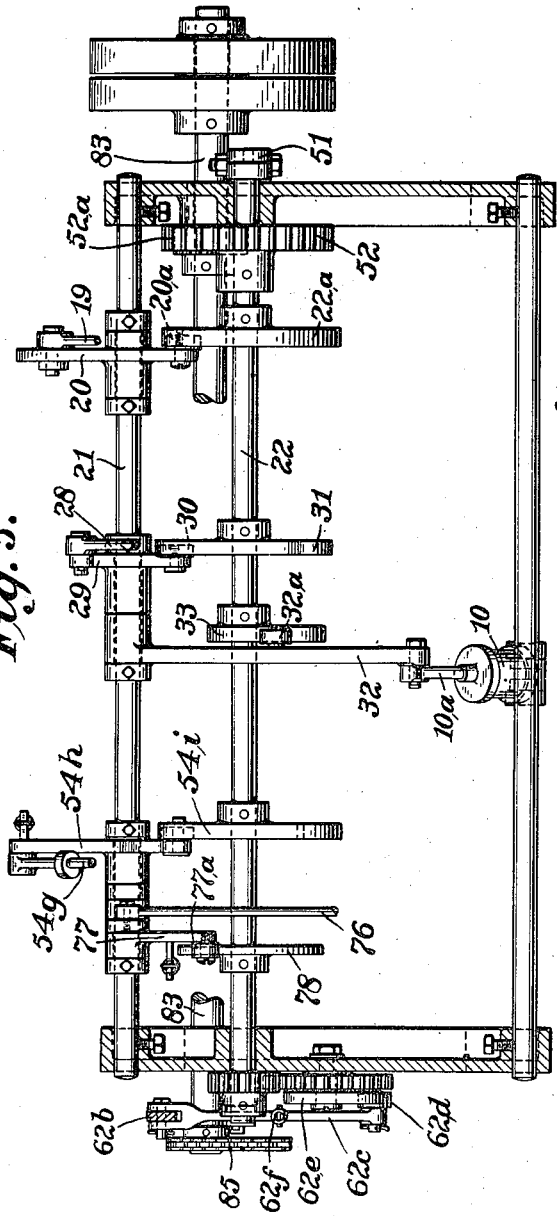
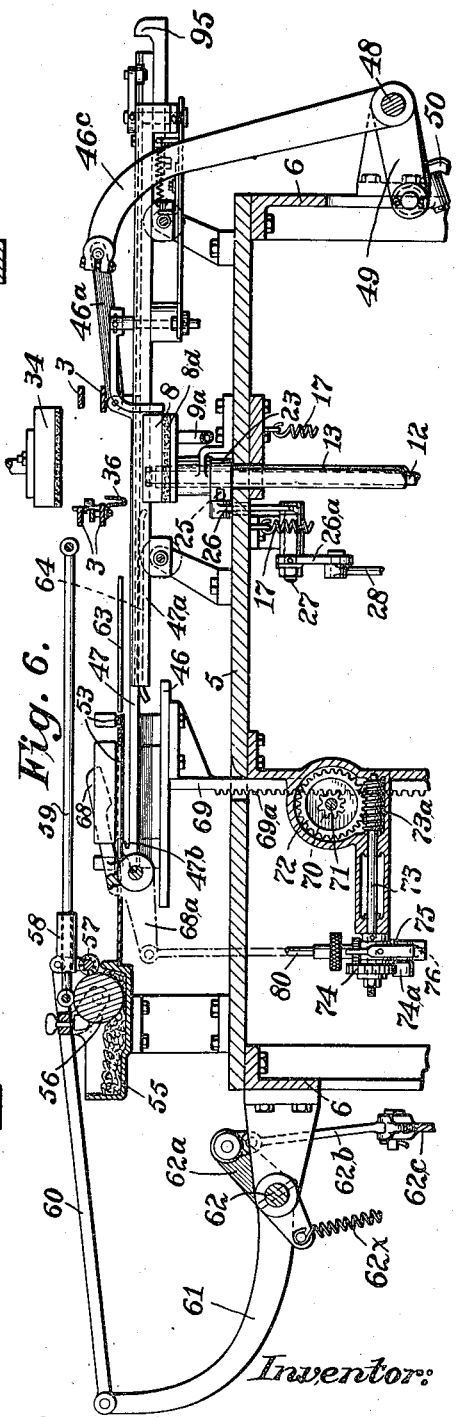
Inventor:  
Chester G. Myers,  
by Spear Middleton Donaldson & Hall  
Attys.

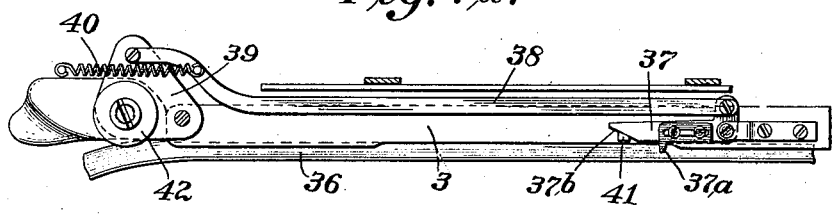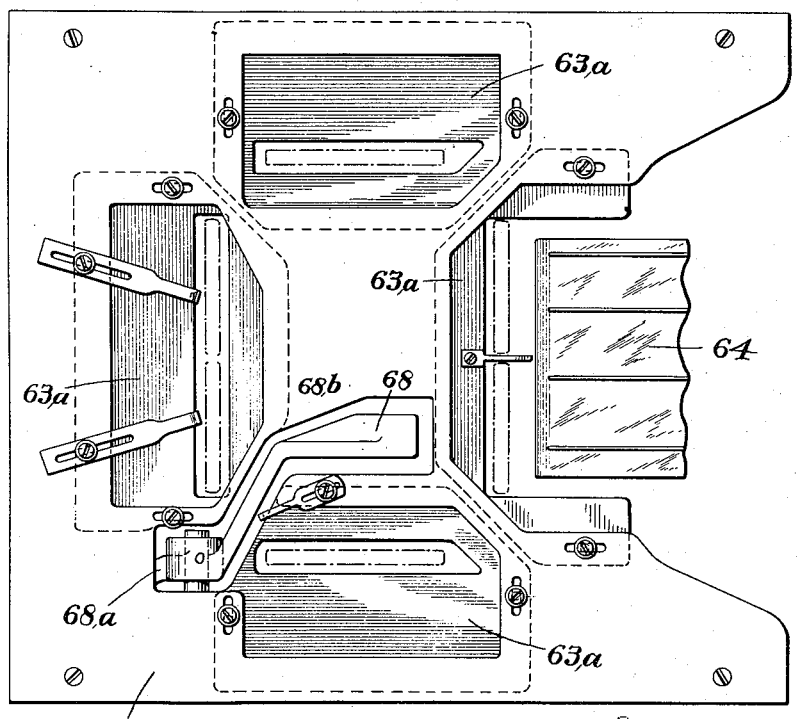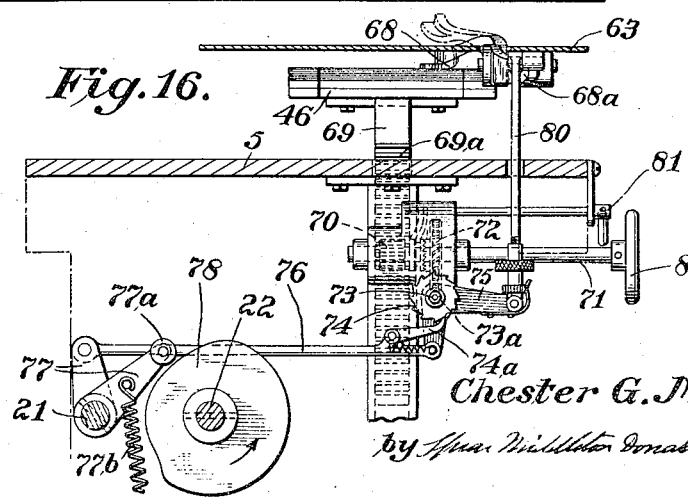

Dec. 7, 1926. 1,609,491
C. G. MYERS
BOX LINING MACHINE
Filed May 19, 1926 7 Sheets-Sheet 7
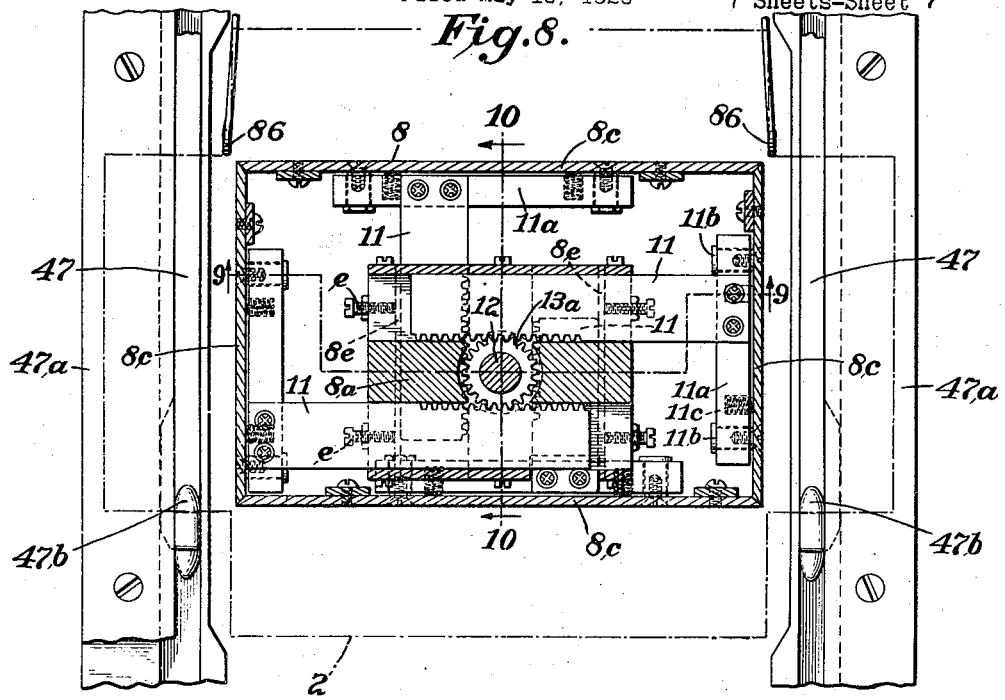
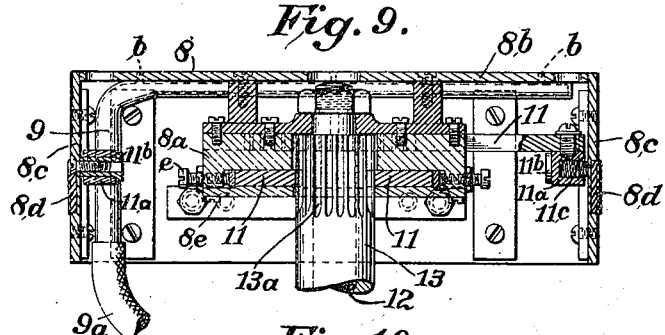
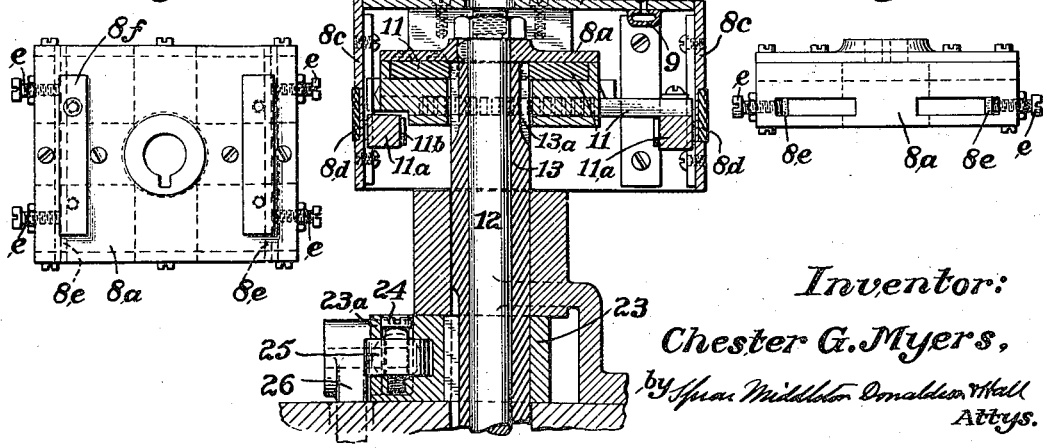
Inventor:
Chester G. Myers,
by Spear Middleton Donaldson & Hall
Attys.

Patented Dec. 7, 1926.

1,609,491

UNITED STATES PATENT OFFICE.

CHESTER GRAHAM MYERS, OF YORK, PENNSYLVANIA, ASSIGNOR TO LESCHEY-MYERS CIGAR BOX COMPANY, OF YORK, PENNSYLVANIA, A CORPORATION OF DELAWARE.

BOX-LINING MACHINE.

Application filed May 19, 1926. Serial No. 110,159.

My said invention relates more particularly to an improved method of, and machine for applying paper linings to the bodies of boxes, such for example, as the ordinary wooden cigar boxes, though not limited to such use.

One of the objects of the invention is to provide a method by which paper linings may be applied to the insides of boxes without danger of any dirt or other foreign material dropping into the box and being retained between the box and lining, or dropping into the box after the lining has been put in place.

Another object is to provide a method by which boxes may be smoothly and rapidly lined with a lining which will be free from folds at the corners.

The invention also aims to provide a machine for applying to such boxes a lining blank composed of a single sheet of paper having a bottom covering portion and four side flaps which when applied to the box, will fit smoothly therein free from folds or wrinkles to collect dust and dirt.

A further object is to provide a machine which will insert the lining while the box body is held in inverted position, whereby any danger of dirt dropping into the same during manipulation is avoided.

Further objects are to provide a machine which will be relatively simple in construction, economical of production and use, and rapid and reliable in action.

With these and various other objects in view, which will be apparent from the subjoined description, the invention includes the novel features of construction and arrangement of parts hereinafter described, the nature and scope of my invention being defined and ascertained by the claims appended hereto.

What I at present consider the preferred embodiment of my invention is illustrated in the accompanying drawings, in which:

Fig. 2 is a front elevation.

Fig. 3 is an end elevation as seen from the right of Fig. 2.

Figure 1:
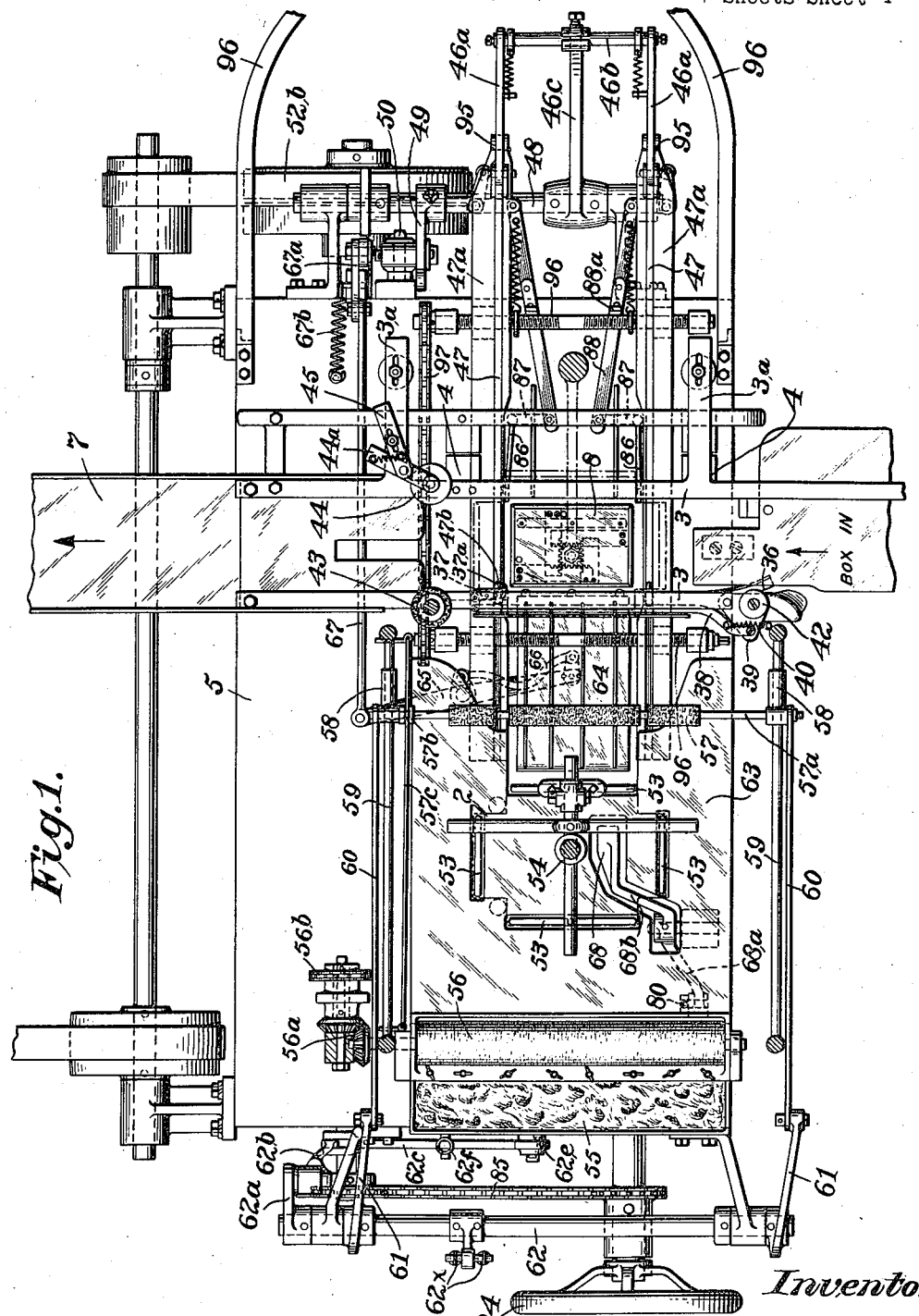
Figure 1 is a plan view of such a machine with parts omitted.

Fig. 3ª is an enlarged sectional detail.

Fig. 4 is a transverse sectional view taken on the line of the plunger or mandrel viewed in the opposite direction from Fig. 3.

Fig. 5 is a sectional plan view on the line of the main cam shaft.

Fig. 6 is a partial longitudinal sectional detail with carrier parts shifted to position for taking a fresh blank.

Fig. 7 is an enlarged detail showing the guides, mandrel and associated mechanism.

Fig. 7ª is an enlarged detail plan view of the box stop and its controlling means.

Fig. 8 is a sectional plan of the plunger and mandrel, with associated carrier bars.

Fig. 9 is a section on line 9—9 of Fig. 8.

Fig. 10 is a section on line 10—10 of Fig. 8.

Figs. 11 and 12 are respectively a plan and a side elevation of the mandrel supporting head or spider.

Fig. 13 is a perspective view showing a box in inverted position and a blank beneath the same.

Fig. 14 is a perspective view of the expanding plunger or mandrel.

Fig. 15 is an enlarged detail plan view of the stencil plates, and

Fig. 16 is a detail view, partly in section, and partly in elevation, showing the blank support elevating means as viewed from the left, Fig. 6.

Referring by reference characters to these drawings, the numeral 1, Fig. 13, designates the box to be lined, which, when ready for lining, is provided with a paper flap 1ª pasted to the inside face of the side wall opposite that to which the cover is hinged, which cover is not shown, as it is not attached until after the box is lined.

2 designates the lining which, as shown, comprises a central portion of a size and shape corresponding to the bottom of the box and four flaps 2ª which correspond in size and shape to the inside faces of the side and end walls of the box. The flaps are provided with adhesive faces, preferably only at their margins, as indicated at 2ᵇ, whereby they adhere to the box walls when pressed thereagainst.

According to my improved method I hold the box in inverted position, as shown in Figs. 2 and 13, and position the blank below the open mouth of the box and force it upward until the bottom covering portion of the blank rests against the inside face of the bottom of the box. Thereafter I press the four side flaps outward against the inside faces of the box walls to which said flaps the secured by the adhesive referred to To support the box in an inverted position I provide horizontally disposed parallel box guides 3 supported by brackets or standards 4 from a table 5 mounted upon end frames 6. The boxes are inserted in the guides, conveniently by hand from the front of the machine and delivered therefrom at the rear, a discharge chute 7 being shown as an example of any suitable means for conveying the lined boxes away from the machine.

Each box is held stationary in a predetermined position in said guides by means hereinafter described and while so held the lining blank is forced up into the same by a mandrel or plunger 8. This comprises a head or spider $8^a$ to which is secured a face plate $8^b$ provided with suction holes $b$ which are in communication with a suction pipe 9 connected with a source of suction such as pump 10 operating in the manner hereinafter particularly described, by a flexible pipe $9^a$.

The mandrel is provided with four side members $8^c$ to which are yieldably secured the outer ends of rack bars 11 which are slidably guided in guideways in the head or spider $8^a$. Said head is rigidly secured to the upper end of a vertical shaft or rod 12 mounted to have axial movement in the main frame which shaft or rod is so positioned that the mandrel is directly beneath the box when the latter is in its aforesaid predetermined position.

For connecting the mandrel sides yieldably to the rack bars I preferably secure to the outer end of each rack bar 11, a cross bar $11^a$ which is provided with openings therethrough, which slidably receive the carrier members or pins $11^b$ having heads on their rear ends larger than the openings and to the front ends of which pins or carrier members the plates or wall members $8^c$ are secured by means such as screws, as clearly shown in Figs. 8 and 9.

Springs $11^c$ seated in recesses in the bars $11^a$ tend to hold the face plates $8^c$ pressed outward to the limit permitted by the heads of the carrier members $11^c$, thus allowing the plates to yield slightly when contacting with the inside walls of the box.

Presser wear plates $8^e$ may be provided to take up any looseness in the rack bars, which plates may be adjusted through the set screws $e$.

Surrounding the rod or shaft 12 is a tubular shaft or sleeve 13 which is mounted to move coaxially with the rod 12 and also to have a slight oscillating movement thereabout. This sleeve 13 is provided at its upper end with an elongated gear $13^a$ with which the racks of the rack bars 11 engage, these lying in pairs on opposite sides of the gear, as shown in Fig. 8, so that on slight rotation of the gear the bars of each pair will be moved in opposite directions and hence all four sides of the mandrel will be simultaneously moved in or out according to the direction of oscillation of the shaft.

It will be understood that only a small amount of rotation is given to the shaft, as only a slight contraction of the mandrel is necessary to enable it to be readily inserted in the box.

The sides of the mandrel are preferably provided with inserts of more or less resilient or cushion material $8^d$ lying in position to align with the adhesive portions $2^b$ of the flaps.

Given a box in proper position and a lining blank lying on the upper face of the mandrel, the piston of pump 10 is drawn outwardly by the operating means hereinafter described, which creates a vacuum and holds the blank firmly in place on the mandrel and simultaneously the mandrel is raised, to cause it to carry the blank into the box, the wings folding down as they encounter the sides of the box.

This elevation of the mandrel is accomplished by springs 17 having their upper ends connected to the under side of the table and their lower ends connected to a cross head $17^a$ connected to the lower end of shaft or rod 12.

Downward movement of the mandrel is accomplished by a bell crank or two-armed lever articulated on a fixed shaft 14 and having an arm 15 connected by a link 16 to a guide member 18 which is fixedly connected to the rod 12 beneath the lower end of tubular shaft 13 and slidably engages guide $6^a$ of the main frame. The other arm $15^a$ of the bell crank lever is connected by rod or pitman 19 (preferably adjustably by a pin and slot connection, as shown) with the one arm of a rocking lever 20 fulcrumed on shaft 21, the other arm of which carries a roller $20^a$ which contacts with a cam $22^a$ of proper contour fast on main cam shaft 22 journaled in suitable bearings in the main frame. By having the mandrel elevated by spring pressure and lowered by cam action, I avoid all danger of damage to boxes that are improperly placed or misaligned with the mandrel.

When the mandrel has reached the limit of its upward movement and the bottom lining portion of the blank seated against the bottom of the box, the mandrel is to be expanded as before explained.

To accomplish this the sleeve 13 is provided with a collar 23 splined thereon and held against vertical movement (Fig. 10), which collar has a projecting portion 23ª to which is secured by screw 24 the one end of a link 25. The other end of link 25 is connected to one arm 26 of a two-armed lever, fulcrumed on stub shaft 27, the other arm 26ª of said lever being connected by a rod or pitman 28 with the free end of a lever arm 29 fulcrumed on shaft 21 and carrying a roller 30 which coacts with a cam 31 having a contour and timing such that the mandrel is expanded only for a short period after it is in place within the box and before it starts its downward movement.

The air pump 10 has its piston rod 10ª connected to a lever 32 fulcrumed on shaft 21 and carrying a roller 32ª which coacts with a cam 33 on cam shaft 22, having a contour and timing such that the pump piston will produce suction on the up stroke of the mandrel and the exhaust on its downward movement, which latter assists in freeing the box and its lining from the mandrel. The pump piston has a slow suction movement and relatively rapid exhaust or blowing movement.

A thrust receiving head 34 is provided in line with the mandrel and in position to bear on the bottom of the box, which head is adjustably carried by a bracket arm 35 and is provided with a face of yielding material such for example as felt.

The guides 3 hereinbefore referred to are preferably in the shape of upper and lower pairs of spaced parallel bars, the upper bars being spaced apart sufficiently to permit the passage of the box therebetween (Fig. 2), and the lower bars projecting inwardly beyond the edges of the upper bars so as to form supports on which the box edges may slide.

One or both of the box guide bars 3 may be adjustable by providing arms 3ª secured to the table by bolt and slot connections, as shown in Fig. 1.

For holding the flap 1ª hereinbefore referred to, out of the path of the plunger J provide a guide 36, Figs. 1 and 2.

The stop mechanism comprises a stop finger 37ª carried by one arm of a bell crank lever 37 fulcrumed on one of the guide rails, the other arm of the bell crank lever extending at right angles to the guide rail (Fig. 7ª) and being connected by a link 38 with a rocking member 39 fulcrumed at the front end of the guide rail or bar. A spring 40 normally pulls the link forwardly and in position to hold the stop finger in position to engage the rear side of the box and position it properly in respect to the plunger. The amount of inward movement permitted to the stop is determined by an abutment member 41 which is engaged by the beveled end 37ᵇ of the bell crank. The stop 37ª is formed in a plate adjustably positioned to the bell crank 37.

The rocking member 39 carries a roller 42 which normally projects into the path of the incoming box so that when a fresh box is inserted the roller 42 is pressed back, which removes the stop or dog 37ª from the path of the lined box and allows the incoming box to push the lined box out ahead of it. For ejecting the box from the machine I provide a continuously driven discharge roller 43 having a peripheral surface of relatively soft material which will have a gripping effect on the side of the box without injury thereto, the box being held in contact therewith by an opposed idle roller 44 carried by a spring pressed arm 44ª which in turn is carried by an adjustable bracket 45. In my present machine I prefer to feed the boxes in by hand, but it will be obvious that mechanism might be devised for this purpose if this was deemed desirable.

While the blanks could be placed upon the mandrel by hand my machine includes mechanical means for doing this which will now be described.

A stack of the blanks is supported upon a table 46, which is adapted to be raised automatically to bring it in line with the transfer devices by means hereinafter more particularly described, and the blanks are successively transferred from the stack to the mandrel by carrier bars 47 which are positioned in line with two opposed flaps of the blanks, such carrier bars being slidably mounted in suitable guides 47ª and operated through links 46ª, cross bar 46ᵇ and arm 46ᶜ fast on shaft 48, the latter carrying an arm 49 which is connected by a link 50 with crank arm 51 on the end of shaft 22, the latter being driven by the gearing 52, 52ª and belt connections 52ᵇ, shown in Fig. 3. The carrier bars have hooked ends indicated at 47ᵇ to engage with the edges of the flaps.

When the carrier bars have moved to position to position a blank over the mandrel, it is necessary that the blank should be accurately positioned with relation thereto.

To accomplish this I provide positioning arms 86, Fig. 2, having downwardly turned end portions adapted to lie adjacent but spaced from the side edges of the forward flap, these arms being carried by vertically disposed rock shafts having arms 87 connected by links 88 with arms 89 fast on vertical shafts 90 and acted upon by springs 91 which tend to separate arms 86, spreading movement being limited by stops 88ª abutting against the threaded adjusting rod hereinafter described. Shafts 90 carry at their upper ends arms 92 provided with rollers 93 (Figs. 1 and 3ª) which are acted on by cam surfaces 94 on the forward ends of the carrier bars. Movement of the carrier bars to the right is limited by stops 95.

Links 46ª are connected to arms 46ᵇ by a lost motion connection such as the pin and slot shown in Fig. 2.

Before the blanks are conveyed to the mandrel they require to have the adhesive applied to their margins, and for this purpose I provide stencil pads 53 secured to a vertically movable stencil carrier 54. Stencil head 54 comprises cross rods on which the stencil pads are adjustably mounted, as shown in Figs. 1 and 2. Said stencil head 54 is carried on the lower end of a vertically movable shaft 54ª guided in a supporting bracket and having clamped thereon a collar 54ᵇ, which is connected by a link 54ᶜ connected to an arm 54ᵈ on a rock shaft 54ᵉ journaled in a fixed bearing and having an arm 54ᶠ connected by a link 54ᵍ with a two-armed lever 54ʰ fulcrumed on shaft 21 and carrying a roller cooperating with cam 54ⁱ on cam shaft 22.

Means are provided for applying glue or other adhesive to the faces of the stencil pads while they are in elevated position, which preferably takes the form of a tank or pan 55 for the adhesive material in which is located a continuously driven supply roller 56, Figs. 1 and 6. Roller 56 is driven by bevel gears 56ª and chain and sprocket connections 56ᵇ from drive shaft 83.

A transfer roller 57 is carried by sleeve brackets 58 slidably guided on rods 59 and operated by links 50 and arms 61 from shaft 62, which in turn is operated in the manner hereinafter described so that when the stencil pads are in elevated position, the transfer roller 57, which has been in contact with the supply roller 56 long enough to be coated thereby, is moved to the right from the position shown in Fig. 6, rolling against the faces of the stencil pads and leaving a coating of the adhesive material thereon. Thereafter the stencil head descends and the adhesively coated stencil pads bear on the margins of the topmost blank, which adheres thereto and is lifted thereby as the stencil head rises. It will be understood that the roller moves to the right on one adhesive applying operation, and back for the succeeding one. To effect better adhesive distribution the roller 57 is made axially movable on its carrying shaft 57ª and this latter is provided with a spool 57ᵇ fast thereon which engages a slightly inclined guide rod 57ᶜ. Fast on the end of shaft 62 is an arm 62ª which is connected by double link connection 62ᵇ to the one end of a lever 62ᶜ of the first order fulcrumed on a fixed pivot. The other end of the lever 62ᶜ has a roller 62ᵈ held in contact with cam 62ᵉ by spring 62ᶠ. Cam 62ᵉ is driven by spur gears from cam shaft 22, as shown in Figs. 2 and 5. Arms 61 are thrown to the right, Fig. 2, by the cam action above described, and returned to the left (Fig. 6) by the action of tension springs 62ˣ.

Located immediately above the topmost one of the pile of blanks is a supplemental table or plate member 63 which has openings corresponding to the stencil pads through which these project into contact with the topmost one of the pile of blanks, it being understood that when the stencil head is descending the carrier bars are in their extreme right hand position, or in other words, at the mandrel end of the machine. The operating mechanism of the stencil head and carrier bars is so timed that the stencil head raises the topmost blank to a position immediately under the supplemental table 63, and then dwells for a moment while the carrier bars are moved to the extreme left, or into the position shown in Fig. 6. Thereafter the stencil head resumes its upward movement and the member 63 strips the blank from the stencils, whereupon it drops on the carrier bars with the rear edges of its side flaps in position to be engaged by the hooked ends 47ᵇ of the carrier bars 47, which are then moved to convey the blank into a position directly above the mandrel.

As the blanks are of relatively thin paper they would, if unsupported, sag between the carrier bars. To prevent this I provide an intermediate supporting member 64 supported by a swing arm 65 and held to parallel or rectilinear movement thereon by parallel link means 66. This member 64 is moved through cam operated link 67 connected to lever 65 so that when the carrier bars move to the left (Fig. 1), member 64 is also moved to the left so that its left hand edge passes beneath the forward edge of the blank, and as the carrier bars advance towards the mandrel the member 64 moves in unison with and supports the intermediate portion of the blank during its passage.

When the right hand edge of member 64 reaches a point adjacent the mandrel it is arrested while the carrier bars continue to move and slide the blank from the member 64 onto the mandrel.

Link 67 is connected to the upper end of a lever 67ª of the first order fulcrumed on a fixed pivot at the right hand end of the machine, which lever carries a roller which cooperates with cam 48ª on shaft 48 (Fig. 3) the roller being held in contact with the cam by spring 67ᵇ.

To prevent any tendency of the blank sticking to the face of member 64 by suction or otherwise, I provide the face of member 64 with parallel ribs preferably in the form of wires 64ª secured thereto.

In order to elevate the pile of blanks so that the topmost one thereof may be always presented in proper position, I provide step by step elevating means for the blank support 46, controlled by feeler member 68 contacting with the upper face of the pile of blanks after the removal of each blank.

In the embodiment shown (see Figs. 2, 6 and 10), the blank support 46 is carried by a slidable upright member 69 having a rack 69ª which meshes with a gear 70 splined on a shaft 71 which also carries loose thereon a worm wheel 72, which meshes with worm 73ª on worm shaft 73, means being provided for clutching gear 70 to worm wheel 72 as hereinafter described. This latter shaft 73 has a ratchet wheel 74 with which cooperates a pawl 74ª carried by continuously operating rocking bell crank lever 75 operated through rod 76 and two-armed lever 77 fulcrumed on shaft 21, one arm of said two-armed lever carrying a roller 77ª cooperating with cam 78 carried by cam shaft 22. The other arm of bell crank lever 75 is connected by link 80 with the arm 68ª of feeler arm 68 fulcrumed on a fixed pivot, whereby the feeler arm is moved up and down in synchronism with the feed of the blanks. The descent of feeler arm 68 is limited by contact with the top of the pile of blanks which limits the throw of the pawl, which merely slides on the face of one of the teeth until movement enough is permitted to allow it to engage the next tooth. The arm 77, being pressed towards the cam by spring 77ᵇ, is free to be held out of contact with more or less thereof, according to the position of contact of the feeler arm with the top of the pile or stack of blanks.

The feeler arm has a diagonal shank portion 68ᵇ, Figs. 1 and 15, which extends across the cut-away corners of the blanks and through the corresponding open corner of the stencil pads so as to project or lie between the ends of adjacent stencil pads and not interfere with the movement thereof.

To enable the operator to raise or lower the table 46 rapidly by hand for restocking, the gear 70 has a clutch member for cooperating with a clutch on the worm wheel, said clutch being controlled by the shifting rod 81, so that the worm wheel can be unclutched from shaft 71 and the latter operated by hand wheel 82.

It is occasionally desirable to operate the machine for a greater or less part of a cycle of operation to position parts for adjustment or other purposes, and to do this I provide hand wheel 84 journaled on a stub shaft at the end of the machine, Figs. 1 and 2, the hub of which wheel is connected by chain and sprocket gearing 85, with shaft 83, whereby the latter may be turned by the hand wheel when the driving belt is on the loose pulley.

A guard rail 96 is provided to protect the workman from contact with moving parts.

Preferably the supplemental table 63 is provided with relatively large openings for the stencil pads, and auxiliary plate members 63ª, having stencil openings, are adjustably connected to the supplemental table 63.

For adjusting the carrier bar guides 47ª towards and from each other to accord with varying sizes of boxes, I provide right and left hand screw threaded rods 96 connected by chain and sprocket connection 97 for adjustment in unison, one of the shafts being provided with a squared end for application of a turning tool or handle.

Various other adjustments are or may be provided for the accommodation of various sized boxes, it being understood that the mandrel itself would be changed to correspond to the size and shape of the box operated on.

A belt shipper rod 97 is provided at the front of the machine having suitable handles 98 convenient to the operator, by which the drive belt 52ᵇ may be shifted from the loose pulley to the fast pulley and vice versa, for controlling the operation of the entire machine at will.

I claim:

1. The hereindescribed method of lining box bodies, which consists in holding the box body in inverted position and inserting a lining blank into the downwardly directed mouth of the box body.

2. The hereindescribed method of lining box bodies, which consists in holding the box body in inverted position, inserting therein a blank having a bottom covering portion, and adhesive wall covering flaps, and thereafter pressing the flaps outwardly against the box walls.

3. In a box lining machine, means for holding a box body in inverted position, and means for forcing an adhesive lining blank up into the box and applying it to the inner walls thereof.

4. In a box lining machine, means for holding a box body in inverted position, a vertically moving mandrel arranged to enter said box, means for supplying an adhesively coated lining blank to said mandrel when in its retracted position, and means for expanding said plunger after it has entered the box body.

5. In a box lining machine, means for holding a box body in inverted position, a vertically moving mandrel arranged to enter said box, means for supplying an adhesively coated lining blank to said mandrel, means for moving said mandrel into and out of the box, and means for applying suction to the face of said mandrel during its upward movement and releasing said suction on its downward movement.

6. In a box lining machine, means for holding a box in inverted position, a vertically moving mandrel arranged to enter said box and having expanding sides, means for reciprocating the mandrel and expanding and contracting the sides, said mandrel having air ports in its face, and means for producing suction on said ports during the entire upward movement of the mandrel, and a quick blowing action at the commencement of the downward movement thereof.

7. In a box lining machine, means for holding a box in inverted position, a vertically moving mandrel arranged to enter said box and having expanding sides, means for reciprocating the mandrel and expanding and contracting the sides, said mandrel having air ports in its face, a single acting air pump having its cylinder connected to said ports, and means for imparting to said piston a slow suction movement during the entire upward movement of the mandrel, and a quick exhaust or blowing movement at the commencement of the downward movement of the mandrel.

8. In a box lining machine means for holding a box body in inverted position, a vertically movable mandrel adapted to enter said box and having expanding sides, means for applying to the upper face of said mandrel a blank having side lining wings projecting beyond the sides of the mandrel, means for reciprocating the mandrel and expanding and contracting the sides, and pneumatic means for holding the blank in position on the mandrel during the upward stroke thereof.

9. In a box lining machine, means for holding a box in inverted position, a mandrel mounted to move into and out of the box, a support for a stack of lining blanks having each a bottom lining portion and integral side lining flaps, means for applying adhesive to said flaps, and means for transferring the blanks successively from said stack to said mandrel.

10. In a box lining machine, means for holding a box in inverted position, a mandrel mounted to move into and out of the box, a support for a stack of lining blanks having each a bottom lining portion and integral side lining flaps, means for applying adhesive to the margins of said flaps, and means for transferring the blanks successively from said stack to said mandrel.

11. In a box lining machine, a table having a guide to permit the passage therethrough of box bodies in inverted position, means for engaging a box to hold it in predetermined position in said guide, a mandrel arranged to enter said box when in such position, and means for supplying adhesively coated lining blanks to said mandrel.

12. In a box lining machine, a table having a guide to permit the passage therethrough of box bodies in inverted position, means for engaging a box to hold it in predetermined position in said guide, a mandrel arranged to enter said box when in such position, means for supplying adhesively coated lining blanks to said mandrel, and means whereby the insertion of a fresh box automatically disengages said engaging means from the lined box.

13. In a box lining machine, means for successively holding boxes in inverted position, a mandrel arranged to enter said box, means for supporting a stack of blanks at one side of said mandrel, an adhesive applying member located above said stack of blanks and movable into and out of contact with the topmost blank, means for applying adhesive to said member, and means for successively transferring the coated blanks to the mandrel.

14. In a box lining machine, means for holding a box body in inverted position, a lining mandrel having laterally moving sides, a vertically moving shaft on which said mandrel is mounted, a rotatable sleeve surrounding said shaft and movable lengthwise therewith, means for imparting vertical reciprocating movement to said shaft and sleeve, means interposed between the sleeve and movable sides whereby oscillation of the sleeve expands and contracts the sides, and means for oscillating the sleeve.

15. In a box lining machine, means for holding a box body in inverted position, a mandrel positioned to enter said box body and having a head member and laterally movable sides, an axially movable shaft having its end rigidly connected to said head member, a sleeve encircling said shaft and movable coaxially therewith, means operatively connecting said sleeve to said movable sides, a gear splined on said sleeve, and means for driving said gear first in one direction and then in the other.

16. In a box lining machine, means for holding a box body in predetermined position, a shaft member movable axially towards and from the open side of the box, a mandrel head fast on the end of said shaft, mandrel sides having rack bars slidably guided by said head, a sleeve encircling said shaft and movable coaxially therewith, and having a gear with which the racks of said rack bars engage, and means for rotating said shaft alternately in opposite directions.

17. In a box lining machine, means for holding a box in predetermined position, a shaft member movable axially towards and from the open side of the box, a mandrel head fast on the end of the shaft and carrying a face plate to coact with the box bottom, rack bars slidably guided by said head and having cross bars at their outer ends, mandrel side plates yieldably carried by said cross bars, a gear rotatably mounted in said head and meshing with all said rack bars, and means for oscillating said gear.

18. In a box lining machine, means for holding a box in predetermined position, a shaft member movable axially towards and from the open side of the box, a mandrel head fast on the end of the shaft and carrying a face plate to coact with the box bottom, rack bars slidably guided by said head and having cross bars at their outer ends, mandrel side plates yieldably carried by said cross bars, a sleeve encircling said shaft and movable coaxially therewith and having a gear with which all the racks of said rack bars engage, and means for rotating said shaft in opposite directions when the mandrel is within the box.

19. In a box lining machine, means for holding a box in predetermined position, a shaft member movable axially towards and from the open side of the box, a mandrel head fast on the end of said shaft having a a face plate to coact with the box bottom, mandrel sides movably held by said head, a sleeve encircling said shaft and movable coaxially therewith, means for oscillating said sleeve when the mandrel is within the box, and connections between said sleeve and sides whereby the oscillation of the sleeve expands and contracts the sides.

20. A machine for lining box bodies, having a loose flap at one edge comprising a guide for the passage of the boxes, means for holding the boxes in said guide in predetermined position when so held, a mandrel movable into and out of the box when so held for applying the lining, and a flap guide associated with the box guide for holding the flap out of the path of the mandrel.

21. In a machine for lining boxes, a guide comprising parallel side rails for engaging the side walls of a box, guide bars for supporting the lower edges of the box located below said first named rails and projecting inward slightly beyond the vertical plane thereof, stop means for holding the box in predetermined position, a lining mandrel mounted to enter the box when so held, and a thrust receiving member located above the bottom of the box when held in such position.

22. In a machine for lining boxes, a guideway adapted to permit boxes to be passed therethrough in inverted position, stop means for holding a box in said guideway in predetermined position, a lining mandrel cooperating with the box when so held, means whereby the insertion of a fresh box actuates said stop means to release the lined box to permit it to be pushed out along the guideway by said fresh box, and positively driven means for ejecting the lined box from the guideway.

23. In a machine for lining boxes, a guideway adapted to permit boxes to be passed therethrough in inverted position, stop means for holding a box in said guideway in predetermined position, a lining mandrel cooperating with the box when so held, means whereby the insertion of a fresh box actuates said stop means to release the lined box to permit it to be pushed out along the guideway by said fresh box, and means for ejecting the lined box from the guideway comprising a driven delivery at one side of the guideway and a yieldably supported idle roller at the opposite side of said guideway.

24. In a box lining machine, means for holding a box in inverted position, a mandrel mounted to move into and out of the box when so held, a support for a stack of lining blanks having each a bottom lining portion and side lining flaps, a stencil head having stencil bars adapted to impinge against the edges of the topmost blank of the pack, a stencil plate located above said topmost blank having stencil openings for the passage of said stencil plates, means for supplying adhesive material to said stencil plates, and carrier means for receiving the coated blank and conveying it to the mandrel.

25. In a box lining machine, means for holding a box in inverted position, a mandrel mounted to move into and out of the box when so held, a support for a stack of lining blanks having each a bottom lining portion and side lining flaps, a stencil head having stencil bars adapted to impinge against the edges of the topmost blank of the pack, a stencil plate located above said topmost blank having stencil openings for the passage of said stencil plates, means for supplying adhesive material to said stencil plates, and reciprocating carrier bars arranged to move between the stencil plate and stack of blanks to receive the coated blank from the stencil head and convey it to the mandrel.

26. In a box lining machine, means for holding a box in inverted position, a mandrel mounted to move into and out of the box when so held, a support for a stack of lining blanks having each a bottom lining portion and side lining flaps, a stencil head having stencil bars adapted to impinge against the edges of the topmost blank of the pack, a stencil plate located above said topmost blank having stencil openings for the passage of said stencil plates, means for supplying adhesive material to said stencil plates, and reciprocating carrier bars arranged to move between the stencil plate and stack of blanks to receive the coated blank from the stencil head and convey it to the mandrel, and a reciprocating blank support for supporting the sheet between the carrier bars.

27. In a box lining machine, means for holding a box in inverted position, a mandrel mounted to move into and out of the box when so held, a vertically movable support for a stack of lining blanks, means for applying adhesive to the topmost blank and conveying it to the mandrel, step by step operating means for elevating said blank support, and a contact member movable to contact with the top of the stack of blanks after the removal of each successive blank for controlling said step by step operating means.

28. In a box lining machine, means for holding a box in inverted position, a mandrel mounted to move into and out of the box, a support for a stack of lining blanks, means for successively transferring the blanks from said stack to the mandrel, and means for accurately positioning the blanks upon the mandrel.

29. In a box lining machine, means for holding a box in inverted position, a mandrel mounted to move into and out of the box, a support for a stack of lining blanks, means for successively transferring the blanks from said stack to the mandrel, and means for accurately positioning the blanks upon the mandrel, comprising opposing side edges of the blank and spaced therefrom, and means for moving them towards each other when the blank is on the mandrel.

30. In a box lining machine, means for holding a box in inverted position, a mandrel mounted to move into and out of the box, supply means for lining blanks having each a bottom lining portion and integral side lining flaps, reciprocating carrier bars having hooked ends to engage the rear edges of opposed flaps to convey them to the mandrel, and positioning fingers for cooperating with opposite edges of the front flaps for accurately positioning each blank on the mandrel.

In testimony whereof, I affix my signature.

CHESTER GRAHAM MYERS.